July 6, 1954 — D. D. REGIER — 2,682,959
WAGON UNLOADING UNIT
Filed Oct. 31, 1952 — 2 Sheets-Sheet 1
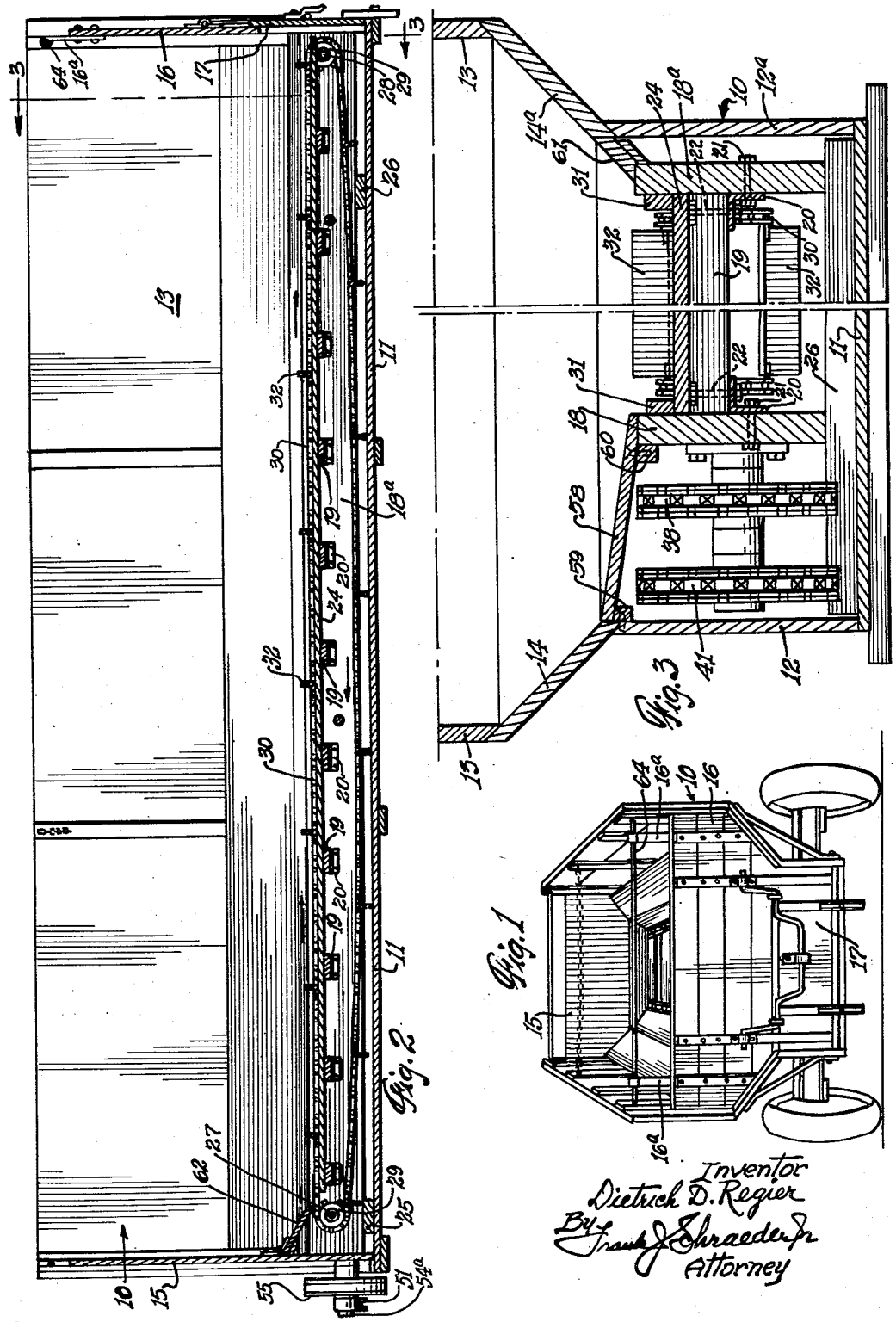
Inventor
Dietrich D. Regier
By Frank J. Schraeder Jr.
Attorney

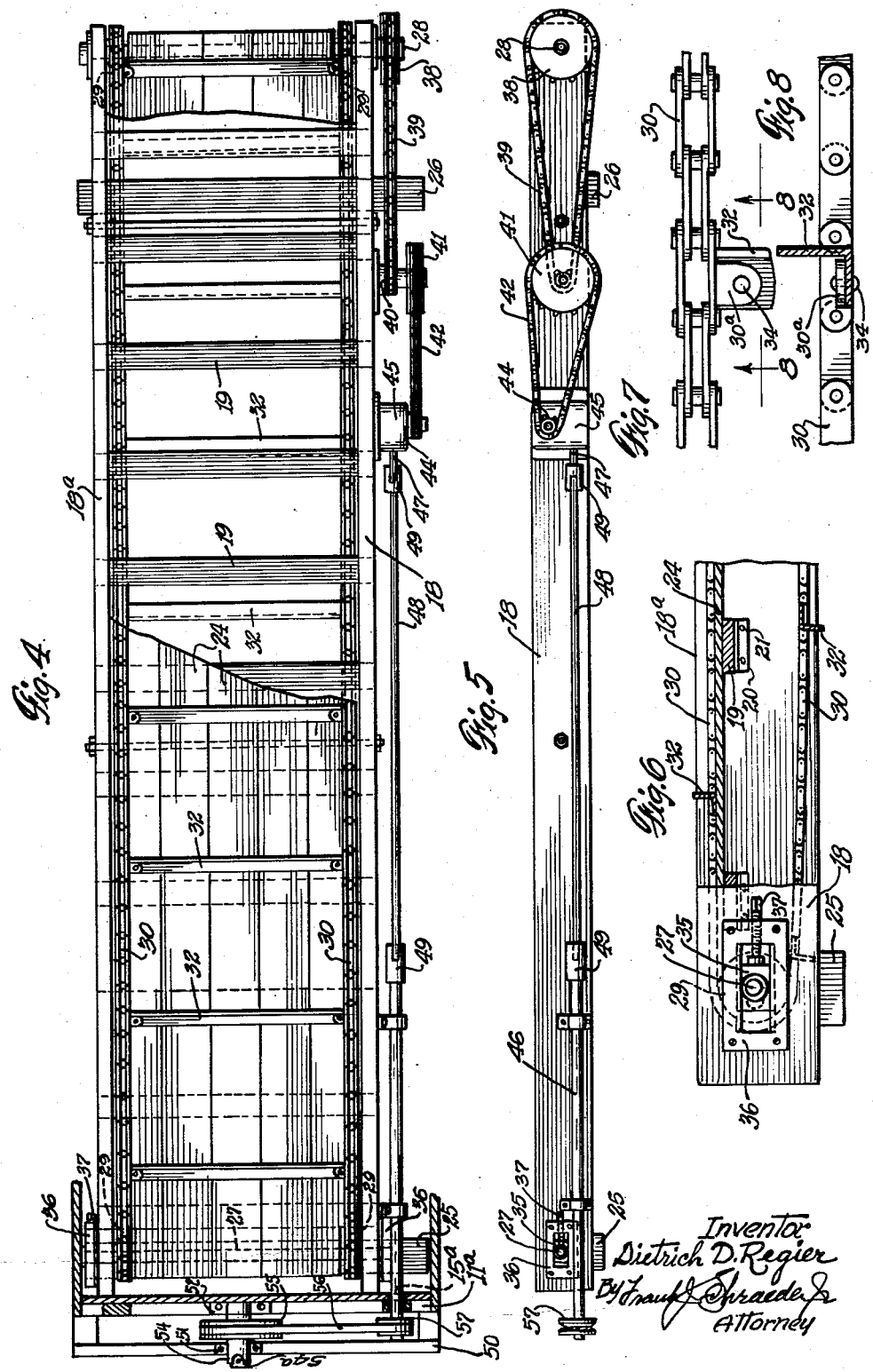

Patented July 6, 1954

2,682,959

UNITED STATES PATENT OFFICE 2,682,959

WAGON UNLOADING UNIT

Dietrich D. Regier, Hillsboro, Kans.

Application October 31, 1952, Serial No. 317,860

2 Claims. (Cl. 214—83.36)

When a farmer takes a load of wheat or other grain, or forage, to a silo or grain elevator, considerable time and labor must be expended in emptying the load.

The object of the present invention is to spare the farmer this labor and loss of time in unloading an ordinary farm wagon.

Generally speaking, this object can be achieved by building farm wagons with self-contained, power operated, unloading apparatus. This is perhaps too expensive for most farmers.

It is therefore my purpose to provide farmers with unloading apparatus which can be applied to their wagons, and furthermore, be installed by the farmers themselves with the tools that every farmer already has on hand.

In order to be able to produce such unloaders at a low cost, there must be quantity production. This is practicable, because there is such a near approach to standardization of farm wagons, at the present time, that a unit intended for use in a particular line of wagons can be used successfully in various competitive wagons.

It may therefore be said to be the specific object or purpose of my invention to create a simple, efficient, inexpensive, self-contained unloading unit which can be manufactured and sold to farmers and which each farmer then easily can install in his wagon; such unit then to be driven by power from any available source, such as the utility shaft of a farmer's tractor, or any prime mover or motor.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a perspective view of a farm wagon equipped in accordance with the present invention.

Fig. 2 is a central, longitudinal vertical section through the wagon, the running gear being omitted.

Fig. 3 is a transverse, vertical section through the wagon box, on a still larger scale, partially broken away, on irregular line 3—3 on Fig. 2.

Fig. 4 is a top plan view of the unloading unit, the floor being partly broken away, and a small fragment of the front end of the wagon being shown.

Fig. 5 is a side view of the complete unit, no part of the wagon box being shown.

Fig. 6 is a view, on a larger scale, partly in elevation and partly in section, corresponding to the left hand end of Fig. 5, with the drive means omitted.

Fig. 7 is a top plan view, on a still larger scale, illustrating the connection between an end of one of the conveyor slats and one of the sprocket chains.

Fig. 8 is a section on line 8—8 of Fig. 7.

Referring to the drawings, 10 represents a wagon body or box having a floor or bottom 11, vertical side sections 12 and 12$^a$ and a widened upper part 13 joined to said side sections by sloping sections 14 and 14$^a$. The box has a front wall or gate 15 and a rear end gate 16. In the lower part is a small door or gate 17.

The structure embodying the present invention is mounted in and substantially fills the space within the box from the floor up to the top of side sections 12 and 12$^a$.

The core of my improved structure is a flat wood frame as long as the wagon box and substantially narrower. In the arrangement shown, this frame comprises two long stringers 18 and 18$^a$ which in a typical construction are 2" x 8" planks about 10 feet long. In between these stringers are cross pieces 19 of 2" x 4", each resting at its ends on little angle iron brackets 20 the horizontal flanges of which are in about the medial horizontal plane of the stringers. The brackets are secured to the stringers by bolts 21, while cross bars 19 are secured to the brackets by bolts 22, the heads of which are countersunk. Overlying and secured to these cross pieces is a continuous floor 24.

The frame just described is six or seven inches narrower than the interior width of the box, measured from wall 12 to wall 12$^a$. Underneath and secured to what may be termed the front end of the frame, is a cross bar 25, while a similar bar 26 underlies the stringers at a substantial distance inwardly from the rear end. Elements 25 and 26 may be 2" x 6" pieces the length of which is not more than a small fraction of an inch less than the width of that part of the wagon box in which the frame is seated. These two cross pieces, lying on their broad sides, need protrude very little, if at all, beyond the outer vertical face of one of the stringers, thus permitting sections of considerable length to project beyond the outer vertical face of the other stringer. The result of this unbalanced arrangement is that the frame, proper, is close to wall 12$^a$ and spaced at least several inches from the opposite wall 12.

Extending between and rotatable in the stringers are two shafts 27 and 28, one close to the front ends and the other at the rear. On each shaft are two sprocket wheels 29. Each sprocket wheel on one shaft is connected to the corresponding sprocket wheel on the other shaft by an endless sprocket chain 30 that embraces the frame; one run of each chain overlying the floor of the frame while the other run underlies the body portion of the frame but remains above the frame-supporting cross pieces 25 and 26.

The parts are so proportioned that the upper runs of the sprocket chains are near the sides of the trough formed by floor 24 and the upper marginal portions of the stringers. Strips 31 are nailed to the inner sides of the stringers, just above floor 24, to prevent the chains from rubbing against the stringers.

Connecting the two sprocket chains 30 together to form a ladder-like belt conveyor are slats 32, preferably angle irons. As best shown in Figs. 7 and 8, some of the links of these chains are provided with ears 30$^a$. The ears on each chain are spaced apart about eighteen inches. Each slat is positioned between the chains with one flange lying flat against the under side of two corresponding ears on the two chains, and its other flange positioned to extend vertically up from floor 24 whenever that slat forms part of the upper run of the conveyor. The slats may be fastened to the ears in any suitable way as, for example, by means of rivets 34.

The bearings for the rear shaft 28 may be stationary, but I provide means for bodily shifting the front shaft 27, to take up undesirable slack in the conveyor. Thus, as best shown in Figs. 5 to 7, shaft 27 is supported in bearing block 35 that is slidable lengthwise of the stringers in stationary fittings 36 fixed to the stringers. Long, sturdy, longitudinal screws 37, extend into said fittings from the rear and thrust against the bearing blocks, to maintain the conveyor under proper tension.

On the outer side of stringer 18 is mounted a drive means for the conveyor so that, when the unit is installed in a wagon box, one need only couple this drive means to a power delivering element to start an unloading operation.

In the arrangement shown, the rear conveyor shaft 28 protrudes from the outer side of stringer 12 and has on such protruding end a sprocket wheel 38. A sprocket chain 39 runs over this wheel and over a small sprocket wheel 40 fixed to a large sprocket wheel 41, rotatably mounted on this stringer. A sprocket chain 42 runs over wheel 41 and over a small sprocket wheel 44 on the output side of a speed reducer 45 of any conventional type.

The means for connecting the speed reducer to an outside source of power will vary with conditions to be encountered. In the arrangement shown, the drive is adapted for receiving its power at the front of the wagon. To this end I mount on the side of stringer 18 a longitudinal, rotatable shaft 46 sufficiently long to protrude from the front end of the wagon; it being necessary to cut a hole 15$^a$ in the front wall or endgate of the wagon for the passage of the shaft. Between the rear end of shaft 46 and the forward end of the power-receiving shaft 47 of the speed reducer is a long shaft 48, coupled at its ends to these shafts by flexible or other couplings 49.

For applying power to shaft 46 I have illustrated a means which has been found to be very satisfactory. On the front of the wagon body there is secured a transverse, horizontal wood beam 50, that may be a 2″ x 4″ in cross section. Mounted on this beam and a ledge 11$^a$ at the bottom of the wagon box are supports 51 and 52 for a short longitudinal shaft 54 located midway between the sides of the box. On this shaft is a pulley 55. A belt 56 extends over this pulley and over a second pulley 57 on the front end of shaft 46. The front end 54$^a$ of shaft 54 is fashioned for coupling to the utility shaft of a tractor and, of course, to other power delivering means.

The space that is left between stringer 18 and side wall 12 of the wagon box, for containing the conveyor drive means, must be closed to keep the contents of the wagon from entering it. For this purpose I provide a long, wide board 58 that rests at one long marginal portion on stringer 18 and at the opposite margin on a cleat or strip 59 on the inner side of wall 12 of the box. A strip 60, on the under side of cover member 58, bears against the outer face of stringer 18 and prevents the cover member from slipping down. A more or less similar cover member 61 is set on stringer 18$^a$ and bears against the adjacent side walls 12$^a$ and 14$^a$ of the wagon box.

As best shown in Fig. 2, a flap 62 is hinged to the front wall 15 of the wagon box, and inclines downwardly and rearwardly into engagement with the conveyor; thus preventing the contents of the wagon from seeping down in front of and blocking the conveyor.

When handling forage it is desirable that the rear end of the wagon box at times be fully open. I therefore hang endgate 16 from a rod 64 spanning the distance between the sides of the box at the top of the latter; the hinge connections being between the rod and long arms 16$^a$ connected to the upper end of the gate. Therefore, when the end gate is swung up to and past a vertical position, no part thereof remains below the level of the rod to obstruct a flow of forage or the like during unloading.

To unload grain, only the small gate or door 17 need be opened.

It will thus be seen that I have made it possible for a farmer to obtain complete unloading equipment the installation of which requires no more than securing a complete apparatus in a wagon and no alterations in the wagon except the boring in one wall of a hole large enough to allow the forward end of a shaft to pass through easily when the complete unit is slid into the wagon from the rear; and that there is no danger of working parts getting out of adjustment during such installation.

I claim:

1. A completely assembled portable wagon unloading unit adapted to be slidably inserted on the floor of the wagon box, comprising a frame having one side thereof spaced farther from an adjacent side wall of the box than the space between the opposite side of the frame and the side wall adjacent thereto to thereby provide a widened space within one side of the wagon box, an endless conveyor mounted on said frame, frame elements on the bottom side of the frame serving as supports resting on the wagon box floor and as spacers between said one side of the frame and the side wall of the wagon box adjacent said widened space, a drive mechanism for the conveyor disposed in said widened space including a drive shaft that projects forwardly beyond the front end of the frame far enough to extend through a hole in the front wall of the wagon box for operative connection with a power delivering means.

2. A completely assembled portable wagon unloading unit adapted to be slidably inserted into a conventional farm wagon box within the side walls thereof, comprising a rigid, flat frame composed of two deep stringers as long as the wagon box, parallel to each other and spaced apart a distance substantially less than the width of the box, spaced cross pieces connecting the stringers in a median plane, a facing carried on the stringers to form a raised floor when the unit is set on the floor of the box, and cross pieces approximately as long as the width of the box underlying the stringers at their rear and front ends and projecting far outwardly from one of the stringers to serve as supports resting on the floor of the box and as spacers to hold the latter stringers spaced well away from the near side wall of the box and provide a free space; an endless conveyor carried on the frame, with the upper and lower runs thereof traveling respectively above and below said raised floor of the frame and parallel to the stringers, the conveyor comprising transverse shafts at the front and rear ends of the frame stringers and having thereon sprocket wheels near the inner sides of the stringers, sprocket chains cooperating with the sprocket wheels, and slats spaced longitudinally of the conveyor and connecting the sprocket chains together and riding on the said facing while forming part of the upper run of the conveyor; a drive for the conveyor located in said free space and mounted on the near stringer, said drive including a driving connection with the rear conveyor shaft.

References Cited in the file of this patent

UNITED STATES PATENTS

| Number | Name | Date |
|---|---|---|
| Re. 23,420 | Weston | Oct. 16, 1951 |
| 1,921,959 | Warren | Aug. 8, 1933 |
| 1,928,859 | Kutscha | Oct. 3, 1933 |
| 2,347,522 | Stinnett | Apr. 25, 1944 |
| 2,478,583 | Hybbert | Aug. 9, 1949 |
| 2,489,055 | Steinacher | Nov. 22, 1949 |
| 2,507,252 | Hoover | May 9, 1950 |